US009825824B2

(12) United States Patent
Plumelle et al.

(10) Patent No.: US 9,825,824 B2
(45) Date of Patent: Nov. 21, 2017

(54) PHYSICAL RESOURCE LIFE-CYCLE IN A TEMPLATE BASED ORCHESTRATION OF END-TO-END SERVICE PROVISIONING

(71) Applicant: Cisco Technology, Inc., San Jose, CA (US)

(72) Inventors: Laurent Plumelle, San Francisco, CA (US); Lawrence Rolfe Kreeger, Fremont, CA (US); Michael Freed, Pleasanton, CA (US); Rituraj Kirti, San Jose, CA (US); Joe Joseph Karimundackal, San Jose, CA (US); Elango Ganesan, Palo Alto, CA (US); Brian Yoshiaki Uchino, Foster City, CA (US); Siva M. Vaddepuri, San Jose, CA (US); Shubhashree Venkatesh, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 216 days.

(21) Appl. No.: 14/578,213

(22) Filed: Dec. 19, 2014

(65) Prior Publication Data
US 2015/0106488 A1     Apr. 16, 2015

Related U.S. Application Data

(63) Continuation of application No. 12/168,831, filed on Jul. 7, 2008, now Pat. No. 8,930,511.

(51) Int. Cl.
*H04L 12/24*     (2006.01)
*G06F 9/50*     (2006.01)

(52) U.S. Cl.
CPC .......... *H04L 41/5054* (2013.01); *G06F 9/50* (2013.01); *G06F 9/5061* (2013.01)

(58) Field of Classification Search
CPC ......... G06F 9/50; G06F 9/5027; G06F 9/5061
USPC ...................................................... 709/221
See application file for complete search history.

(56) References Cited

U.S. PATENT DOCUMENTS

| | | | |
|---|---|---|---|
| 6,859,889 B2 * | 2/2005 | Matsuura | G06F 11/2025 707/999.202 |
| 8,930,511 B1 * | 1/2015 | Plumelle | G06F 9/50 709/221 |
| 2003/0110263 A1 * | 6/2003 | Shillo | G06F 3/0601 709/226 |
| 2005/0044220 A1 * | 2/2005 | Madhavan | G06F 9/5027 709/225 |
| 2005/0044301 A1 * | 2/2005 | Vasilevsky | G06F 9/45533 711/1 |
| 2005/0080982 A1 * | 4/2005 | Vasilevsky | G06F 3/0607 711/1 |
| 2005/0120160 A1 * | 6/2005 | Plouffe | G06F 9/45537 711/1 |

(Continued)

*Primary Examiner* — Imad Hussain
(74) *Attorney, Agent, or Firm* — Ronald S. Fernando (57) ABSTRACT

In one embodiment, the system may identify a virtual network, the virtual network including a plurality of virtual entities and connections among the plurality of virtual entities. The system may automatically map each of the plurality of virtual entities to one or more resources or resource pools such that the virtual network is mapped to a physical network, wherein mapping includes allocating one or more resources or resource pools to a corresponding one of the plurality of virtual entities.

20 Claims, 7 Drawing Sheets

(56) References Cited

U.S. PATENT DOCUMENTS

| | | | |
|---|---|---|---|
| 2006/0143517 A1* | 6/2006 | Douceur | G06F 11/1484 714/21 |
| 2007/0234351 A1* | 10/2007 | Iyoda | G06F 8/60 717/174 |
| 2007/0237162 A1* | 10/2007 | Hamanaka | G06F 11/1662 370/401 |
| 2007/0283422 A1* | 12/2007 | Iyoda | G06F 21/6227 726/4 |
| 2008/0162810 A1* | 7/2008 | Taguchi | G06F 3/061 711/114 |
| 2008/0235361 A1* | 9/2008 | Crosbie | G06F 9/5027 709/223 |
| 2008/0244068 A1* | 10/2008 | Iyoda | G06F 9/5083 709/224 |
| 2008/0256548 A1* | 10/2008 | Branson | G06F 9/5072 718/106 |
| 2009/0241108 A1* | 9/2009 | Edwards | G06F 21/604 718/1 |
| 2010/0262559 A1* | 10/2010 | Wilcock | G06Q 10/00 705/348 |
| 2010/0280863 A1* | 11/2010 | Wilcock | G06Q 10/00 705/7.11 |
| 2011/0004565 A1* | 1/2011 | Stephenson | G06Q 10/06 705/348 |

* cited by examiner

PHYSICAL RESOURCE LIFE-CYCLE IN A TEMPLATE BASED ORCHESTRATION OF END-TO-END SERVICE PROVISIONING

RELATED APPLICATIONS

This application claims the benefit of U.S. patent application Ser. No. 12/168,831, filed on Jul. 7, 2008, issued as U.S. Pat. No. 8,930,511, and which is incorporated by reference herein.

TECHNICAL FIELD

The present disclosure relates generally to methods and apparatus for provisioning resources for use by a network.

DESCRIPTION OF THE RELATED ART

Networks such as data centers are often configured by different teams of individuals. As a result, it often takes 3 to 6 months to deploy a particular network, due to manually coordinated configuration steps on different devices by different teams. Unfortunately, long lead times for provisioning and over provisioning of resources are common problems. Moreover, debugging such networks is typically difficult due to the lack of accessible data regarding physical devices and configurations.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, the system may identify a virtual network, the virtual network including a plurality of virtual entities and connections among the plurality of virtual entities. The system may automatically map each of the plurality of virtual entities to one or more resources or one or more resource pools such that the virtual network is mapped to a physical network, wherein mapping includes allocating one or more resources or resource pools to a corresponding one of the plurality of virtual entities.

Specific Example Embodiments

In accordance with various embodiments, the system manages resources. For example, the resources may include physical hardware such as switches, servers, firewalls, load balancers, data storage equipment, etc. As another example, the resources may include software or other resources, such as virtual local area networks (VLANs), virtual storage area networks (VSANs), etc.

In accordance with one embodiment, resources may be allocated in association with a set of one or more network devices. This allocation may be in association with a physical network, or may be in association with a virtual network (i.e., template). Such a virtual network is a virtual entity that may also be referred to as a service network, which may include or otherwise support a software application. The virtual network may include a plurality of virtual entities, where each of the virtual entities may be mapped to a set of one or more resources (or resource pools). A virtual entity may represent a particular physical entity and/or function. For example, a virtual entity may be a virtual server, which may be mapped to a physical server, Ethernet switch ports, and storage. In this manner, a virtual network may be mapped to a physical network.

Figure 1:
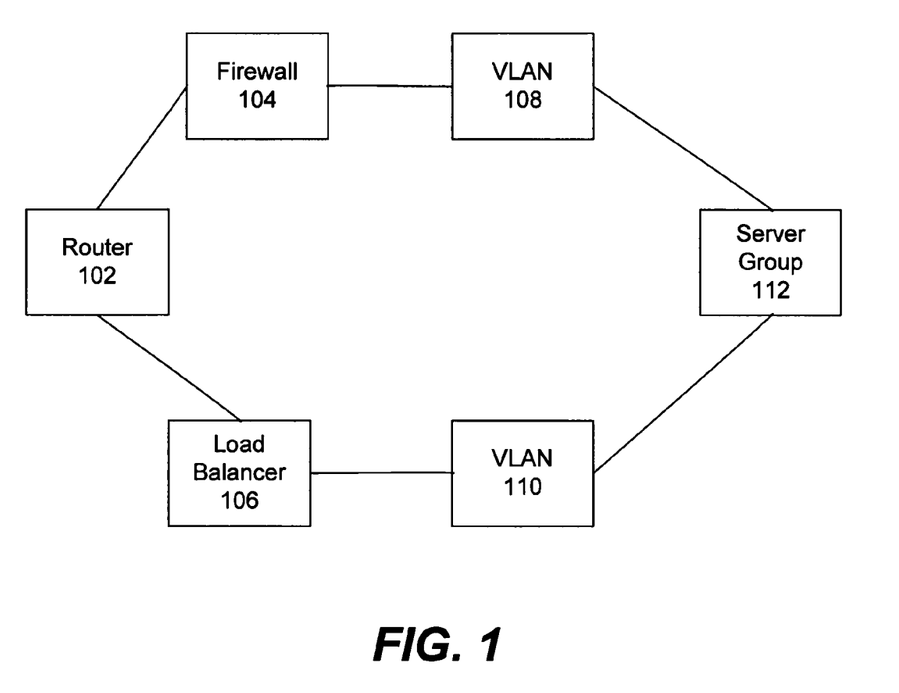
FIG. 1 is a diagram illustrating an example template.

FIG. 1 is a diagram illustrating an example template. The template represents a set of virtual entities and connections among these virtual entities. In this example, the template includes a router 102, a firewall 104, a load balancer 106, VLANs 108, 110, and a server group 112 including one or more servers. As shown in this example, the template may also specify connections among the virtual entities 102-112. These connections may be specified, for example, by identifying networks or sub-networks associated with each connection. Each of the virtual entities 102-112 may be implemented by one or more resources and/or one or more pools of resources. In order to specify a particular implementation, one or more resources and/or pools of resources may be allocated to (i.e., assigned to) the template or virtual context within which the template has been defined.

Figure 2:
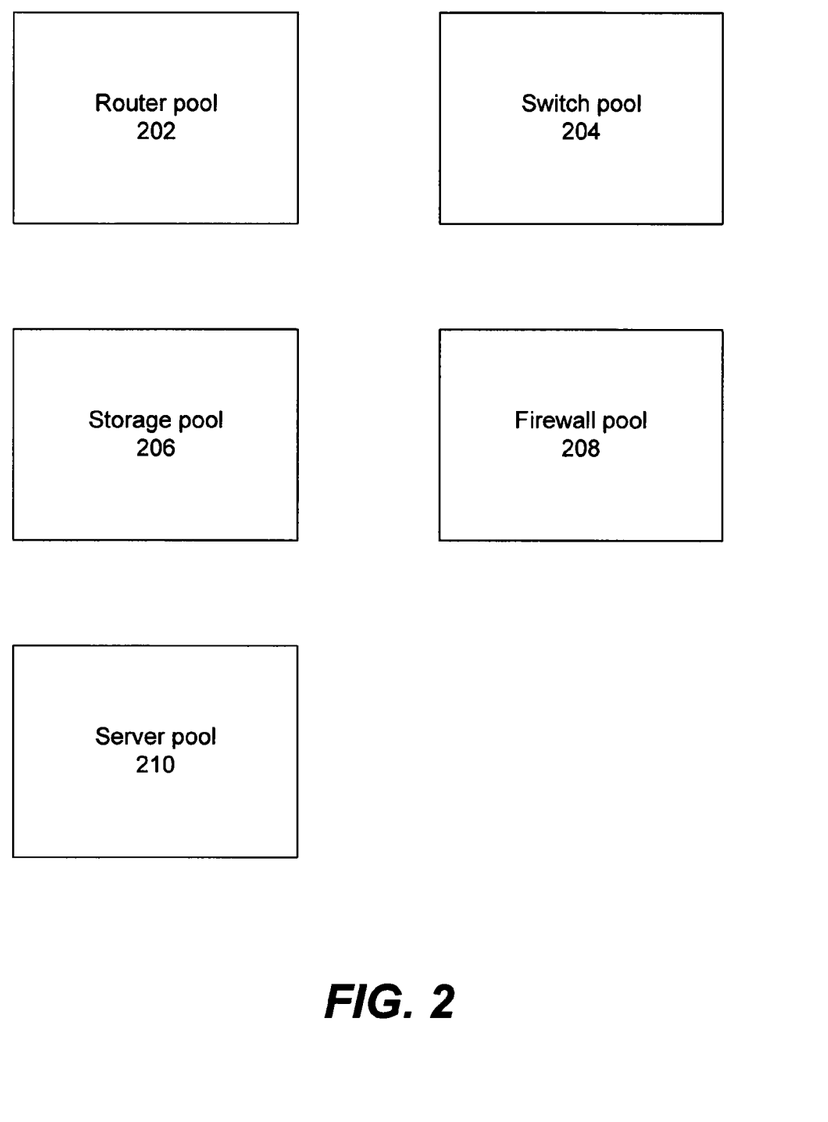
FIG. 2 is a diagram illustrating an example set of resource pools in accordance with one embodiment.

FIG. 2 is a diagram illustrating an example set of resource pools in accordance with one embodiment. In this example, there are five resource pools: a router pool 202 including one or more routers, a switch pool 204 including one or more switches, a storage pool 206 including one or more storage devices (e.g., disk arrays, Logical Units (LUNs), etc.), a firewall pool 208 including one or more firewalls, and a server pool 210 including one or more servers. It is important to note that these resource pools are merely examples, and therefore other types of resources (or subsets of resources) may be grouped in a resource pool.

Each resource pool may include one or more resources of the type included in that pool. A resource pool may be static (list-based) or dynamic. For example, a dynamic resource pool can be based upon query criteria, where a resource may be automatically included in a particular resource pool where the resource satisfies the resource pool's query criteria. In one embodiment, those resources that are in a managed state can be included on one or more resources pools, as will be described in further detail below. Each resource pool (or portion thereof) can be assigned to one or more virtual contexts, as will be described in further detail with reference to FIG. 3.

Figure 3:
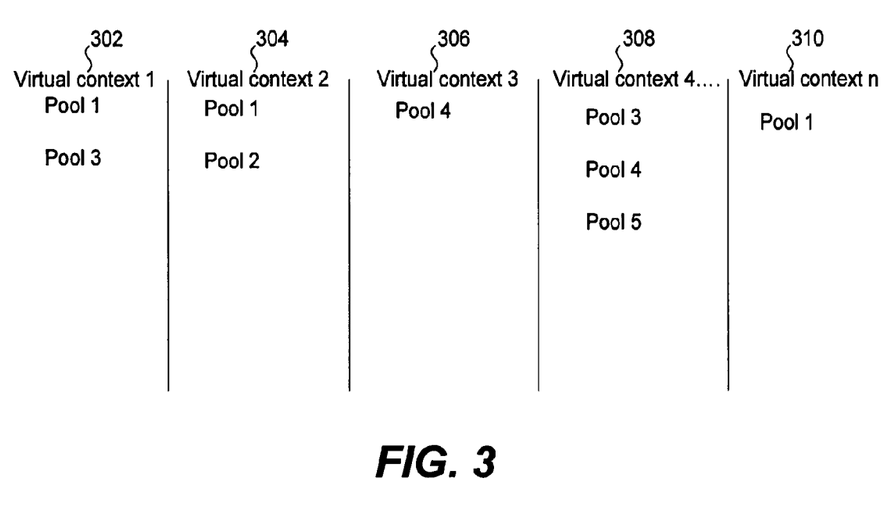
FIG. 3 is a diagram illustrating example virtual contexts that may be implemented in accordance with one embodiment.

FIG. 3 is a diagram illustrating example virtual contexts that may be implemented in accordance with one embodiment. The system may support a plurality of virtual contexts. In this example, the virtual contexts include virtual context 1 302, virtual context 2 304, virtual context 3 306, virtual context 4 308, and virtual context n 310. A set of resources including at least a portion of one or more of the resource pools may be assigned to each virtual context (e.g., from a general administrative domain). In this example, pool 1 and pool 3 have been assigned to virtual context 1 302, pool 1 and pool 2 have been assigned to virtual context 2 304, pool 4 has been assigned to virtual context 3 306, pools 3, 4, and 5 have been assigned to virtual context 4 308, and pool 1 has been assigned to virtual context n 310. Thus, the virtual contexts may share access to various resources. For example, virtual context 1 302, virtual context 2 304, and virtual context n share access to pool 1. Of course, the virtual contexts may also have exclusive access to various resources. In this example, virtual context 3 306 has exclusive access to pool 5.

Each virtual context may represent an administrative domain via which a corresponding set of resources may be visible to users associated with that domain, enabling the users to assign (i.e., allocate) any of the set of resources to virtual entities within a virtual network. For example, a user may login to an administrative domain in order to access the corresponding set of resources. As set forth above, those resources that are visible may be managed resources.

Once a user logs into a virtual context, the user may assign a resource or resource pool to the virtual context. Similarly, the user may also un-assign a resource or resource pool from the virtual context. In one embodiment, un-assignment may not be permitted if the resource or resource pool has been assigned to a virtual network defined in the virtual context.

One or more rules may be created in association with a virtual context. For example, a rule may indicate privileges associated with a user or the user's role. For example, a storage administrator may be allowed to discover and inventory storage resources, while a template designer may only be allowed to create a template.

In order to create a physical network, a template (i.e., virtual network) may be deployed in a physical network using specific resources or resource pools. In other words, individual resources and/or resource pools may be assigned to virtual entities in the virtual network.

Figure 4A:
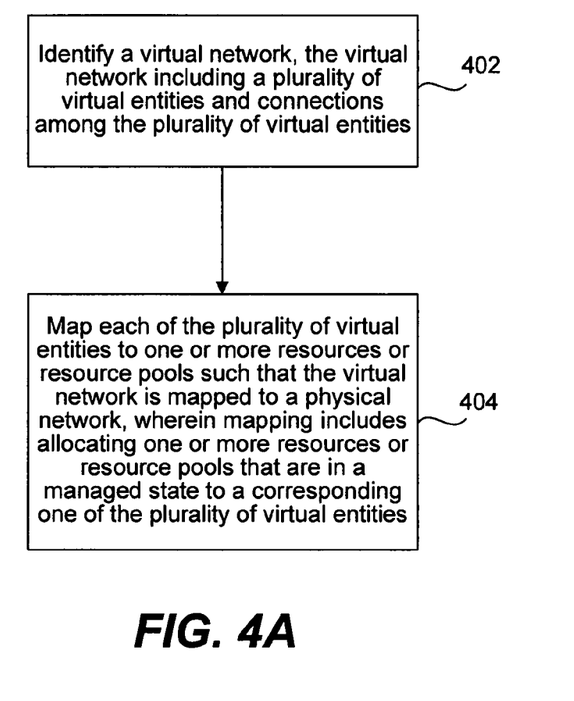
FIG. 4A is a process flow diagram illustrating an example method of allocating resources to a virtual network.

Assignment of resources or resource pools to virtual entities represented by a template may be performed in response to user input or may be performed automatically. FIG. 4A is a process flow diagram illustrating an example method of allocating resources to a virtual network. The system identifies a virtual network at 402, the virtual network including a plurality of virtual entities and connections among the plurality of virtual entities. The system may then map each of the plurality of virtual entities to one or more resources or resource pools such that the virtual network is mapped to a physical network at 404. More specifically, mapping may be performed by allocating one or more resources or resource pools that are in a managed state to a corresponding one of the plurality of virtual entities. Such allocation may be performed in response to user input, or automatically.

Figure 4B:
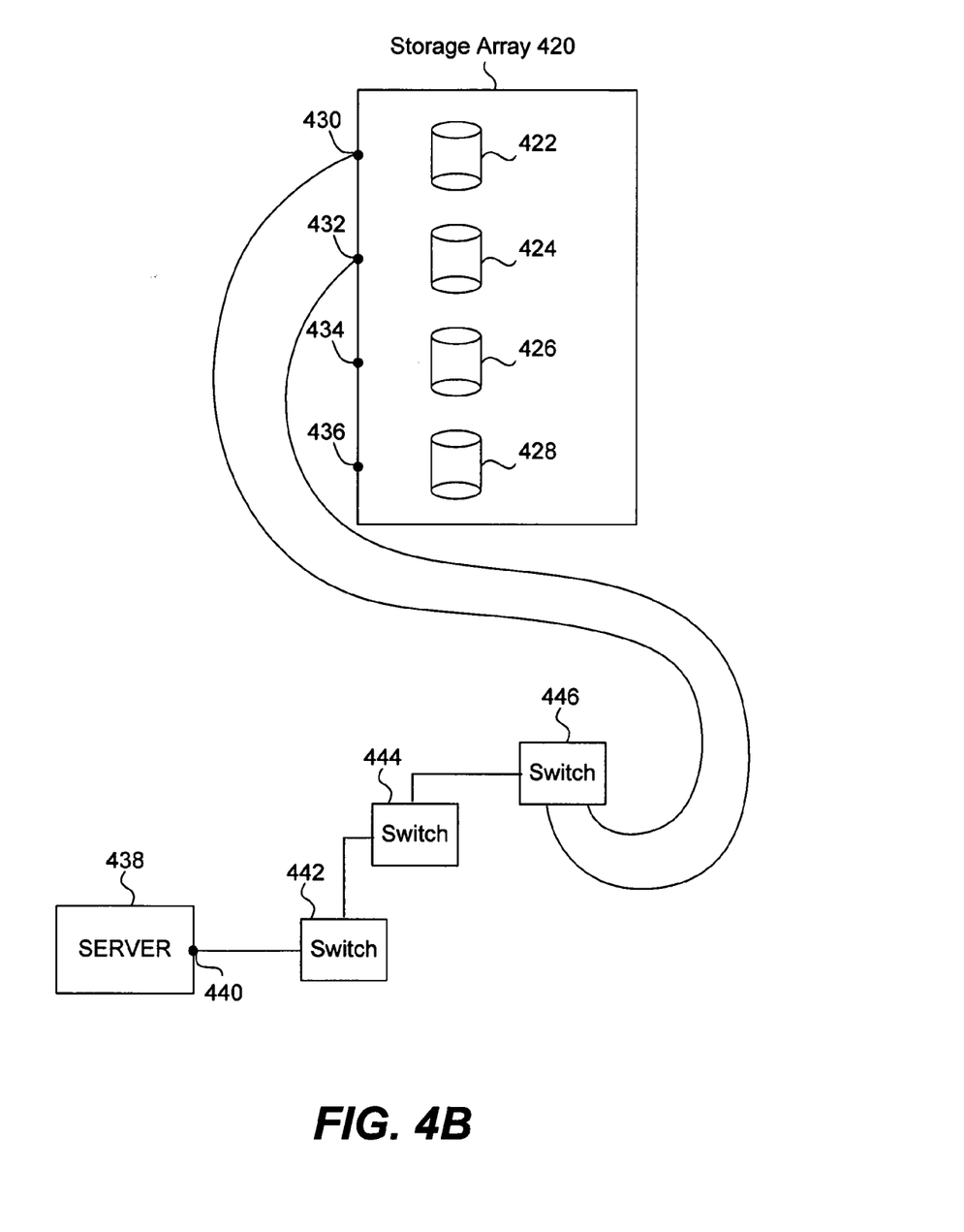
FIG. 4B is a diagram illustrating an example system in which resources may be automatically allocated.

FIG. 4B is a diagram illustrating an example system in which resources may be automatically allocated. As shown in this example, a storage array 420 may include a set of disks 422, 424, 426, 428, which may be referred to as LUNs. The storage array 420 may include one or more storage array ports 430, 432, 434, 436. A network device (e.g., server) 438 may be coupled to the storage array 420 via one or more server ports 438, 440. In this example, the server 438 is coupled to the storage array 420 via a set of switches 442, 444, 446. It is important to note that although a single server is shown in this example, multiple servers may be coupled to the same storage array 420. Similarly, one or more servers may access each of the LUNs 422, 424, 426, 428. In other words, a LUN may be shared or dedicated to a set of one or more servers.

A variety of processes may be performed in order to allocate one or more LUNs and/or storage array ports to a network device such as a server. Various examples that will be described herein include the round-robin algorithm, the greedy algorithm, and the saturation algorithm.

In accordance with one embodiment, when a dedicated LUN is to be assigned to a server, a LUN of the appropriate size may be selected. A set of one or more of the storage array ports that the LUN can use to communicate with the server may be selected. A round-robin algorithm may be used to select the next storage array port that is not fully saturated. Saturation may be determined using a variety of metrics (e.g., bandwidth, load, etc.).

In accordance with another embodiment, the greedy algorithm may be used to apply a metric in order to assign a storage array port to a server. For example, the metric may be based upon factors such as load and/or bandwidth. The system may maintain a list of storage array ports, where each of the storage array ports has a value associated with the metric. For each LUN chosen by the system, one of the storage array ports having the minimum (or maximum) metric value is selected.

In accordance with yet another embodiment, a saturation algorithm may be applied in order to assign a storage array port to a server. Specifically, the saturation algorithm may apply a metric to determine a metric value associated with a storage array port. The metric may be based upon factors such as load and/or bandwidth. The system may maintain a list of storage array ports, where each of the storage array ports has a value associated with the metric. For each LUN chosen by the system, a chosen storage array port is reused until the storage array port is fully saturated, as determined by the corresponding metric value.

A port associated with the server (e.g., a server port or a port associated with a gateway that performs translation) may be mapped to each corresponding storage array port in order to allow the server to access the selected LUN(s). The server port may be identified by a world wide port name (WWPN). The server port association may be performed automatically, or manually.

In accordance with one embodiment, a shared LUN may be allocated to multiple servers. For example, a pre-existing shared LUN may be allocated to a newly created server in a pool of servers. The system may maintain a list of the mapping between the resources and/or resource pools and the virtual entities until all iterations of the desired algorithm are applied. An identifier of each of the LUNs may then be supplied to the server(s) to which the LUNs have been allocated. When the mapping has been successfully completed for all virtual servers, the mapping may be stored in association with the virtual network.

In order to ensure that a server has access to a particular LUN, the system may ensure that the server (or server port) and corresponding LUN(s)/storage array port(s) are in the same VSAN. For example, the system may automatically associate the server (or server port) and corresponding LUN(s)/storage array port(s) with a particular VSAN. Moreover, it may also be desirable to set up a zone in which the server and the disk array are permitted to communicate.

In accordance with one embodiment, the system may manage the resources using a resource life-cycle model. For example, the life-cycle of a resource may include a number of states, such as a discovery phase, managed state, maintenance state (which may include other sub-states), and an unmanaged state.

In one embodiment, resources may be added to the system or discovered. Newly discovered or added resources may be put in an unmanaged state. While resources are in the unmanaged state, the resources may not be allocated for use by virtual entities, network devices or applications.

Figure 5:
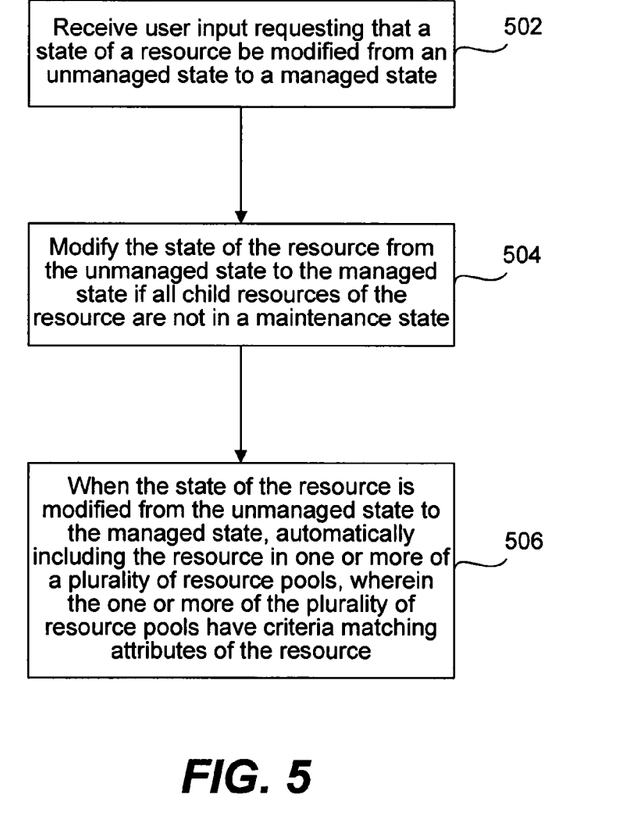
FIG. 5 is a process flow diagram illustrating an example method of managing resources in accordance with one embodiment.

FIG. 5 is a process flow diagram illustrating an example method of managing resources in accordance with one embodiment. The system may receive user input requesting that a state of a resource be modified from an unmanaged state to a managed state at 502. The system may modify the state of the resource from the unmanaged state to the managed state if all child resources of the resource are not in a maintenance state at 504. When the state of the resource is modified from the unmanaged state to the managed state, the system may automatically include the resource in one or more of a plurality of resource pools, wherein the one or more of the plurality of resource pools have criteria matching attributes of the resource at 506. For example, such criteria may indicate a type of resource (e.g., memory, switch, router, etc.).

Managed State

Once the resource is in the managed state, the resource may be visible for use in provisioning. For example, where the resource is included in a particular pool, those contexts that include that pool will enable users that log in to those contexts to provision the managed resource. Moreover, when a resource is managed, information associated with the resource such as its health and usage may be monitored. In one embodiment, managed resources cannot be deleted by a user. However, a user may choose to change the state of the resource from managed to unmanaged, as will be described in further detail below.

Resources that are in a managed state may be provisioned (i.e., allocated) to a virtual network. Such allocation may be initiated by a user or may be performed automatically. Various algorithms may be applied in order to allocate resources, as described above.

Maintenance State

A user may choose to modify the state of a resource to a maintenance state (e.g., from a managed state). If the resource is not in use by one or more network devices (e.g., associated with one or more virtual entities), the state of the resource may be changed from the managed state to the maintenance state. In accordance with one embodiment, when the resource is in the maintenance state, it cannot be allocated to or acquired (e.g., used) by a set of network devices. Moreover, automatic monitoring of the health of the resource may be suspended while the resource is in the maintenance state. The user may move the resource back to the managed state when the maintenance has completed. For example, the user may invoke a maintenance completed action.

Marked for Maintenance State

If a resource is in use by one or more network devices (e.g., associated with a virtual network) when a user requests that it be moved to the maintenance state, the resource may be moved to a marked for maintenance state. In the marked for maintenance state, the resource will not be acquired by additional network devices. When the resource is no longer in use by one or more network devices (e.g., when the resource is released), the state of the resource may be automatically modified from the marked for maintenance state to the maintenance state. In addition, the user may be notified of this change in state. While the resource is in the marked for maintenance state, the user may change their mind and move the resource back to the managed state by invoking a cancel maintenance action.

Unmanaged State

A user may change the state of a resource from managed to unmanaged by invoking an unmanage action. Unmanaged resources may no longer be visible in various virtual contexts, since they cannot be allocated for use by network devices (or an associated virtual network). However, the unmanaged resources may still be visible in a general resource management user interface.

Unmanaged resources may be moved back to the managed state by invoking the manage action. In one embodiment, when a parent resource (e.g., a switch) is changed to the managed state, the system may check if each of the parent's child resources (e.g., modules of the switch) is in the managed state. If not, the system may move the state of the parent's child resources to managed. Of course, if any of the child resources cannot be moved to the managed state (e.g., where they are in the maintenance state), the system may not move the state of the parent to managed. For example, where a user attempts to invoke a manage operation on a server, the system may check if the switch that the server is connected to is in the managed state. If not, the system may attempt to change the state of the switch to the managed state. Unmanaged resources may also be deleted from the resource management user interface.

Similarly, a resource can be moved to the unmanaged state if the resource is not in use by any network devices (e.g., associated with a service network). In addition, the resource may not be moved to the unmanaged state if the resource has been assigned to one or more network devices (or virtual networks). The system may also determine whether the resource has one or more child resources. If the resource has one or more child resources, the system may determine whether the child resources are in the unmanaged state before changing the state of the parent resource to the unmanaged state. If the child resources are not already in the unmanaged state, the system may determine whether any of these child resources are in use by (or have been assigned to) any network devices (or service networks). If any of the child resources are in use (or have been assigned), the system may not change the state of these child resources to the unmanaged state and therefore the system may not change the state of the resource to the unmanaged state.

Resource Visibility

Resources may be "visible" to a user via a user interface based upon its lifecycle state. For example, resources that are in the managed state may be visible. Moreover, resources may be visible to a user based upon the virtual context with which the user is associated. Where each virtual context represents a different administrative domain, a user may log into his or her domain in order to manage resources that are visible to users of that domain. Managed resources and pools containing them can be individually assigned to one or more virtual contexts, enabling the managed resources to be acquired (e.g., used) by one or more network devices (or an associated virtual network). Once a resource is assigned to a virtual context, the resource may automatically appear in a dynamic criteria based pool that is present in that virtual context. In one embodiment, one of the virtual contexts may be a general administrative context in which resources are initially placed.

Hardware Replacement

In one embodiment, it may be possible to replace a resource that is no longer available. For instance, a resource that was previously in a managed state may be in the unmanaged state or the maintenance state, and therefore no longer available. If a new hardware resource is made available (e.g., present in the general administrative context) and the new hardware resource has the same configuration (e.g., same modules and/or capabilities) as the unavailable resource, the unavailable resource may be replaced by the new resource. For instance, a specific fault may be raised on the unavailable resource. The unavailable resource may then be automatically replaced by the new resource. Alternatively, a user may invoke a replace resource action. In either case, the system may update its inventory of resources, use the new hardware resource in place of the unavailable resource, and/or clear the fault.

Other Embodiments

Generally, the disclosed techniques may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid implementation of the disclosed embodiments may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, various embodiments may be implemented in specially configured routers or servers available from Cisco Systems, Inc. of San Jose, Calif. A general architecture for some of these machines will appear from the description given below. In an alternative embodiment, the disclosed techniques may be implemented on a general-purpose network host machine such as a personal computer or workstation. Further, the disclosed embodiments may be at least partially implemented on a card (e.g., an interface card) for a network device or a general-purpose computing device.

Figure 6:
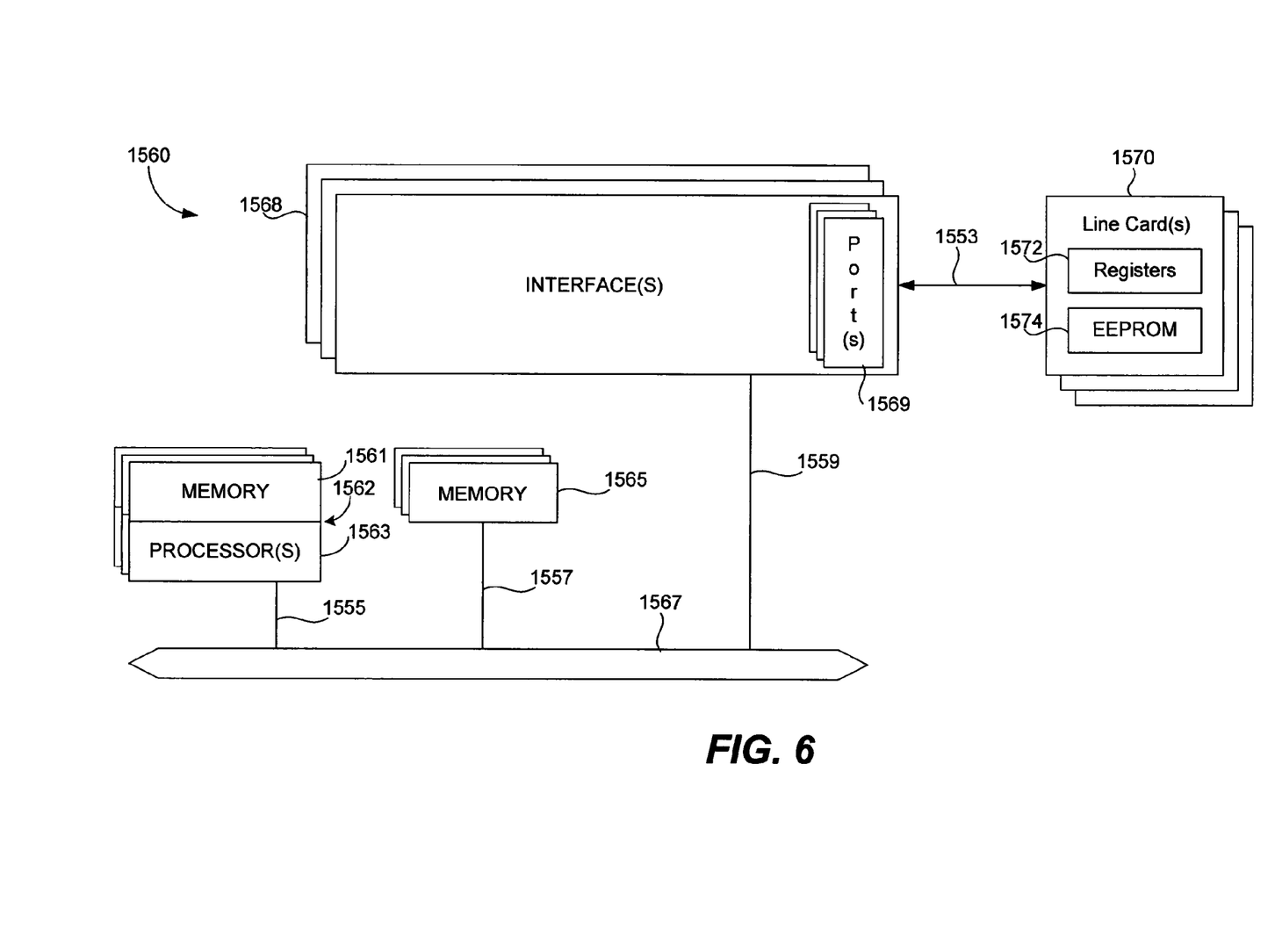
FIG. 6 is a diagrammatic representation of an example network device in which various embodiments may be implemented.

Referring now to FIG. 6, a network device 1560 suitable for implementing the disclosed embodiments includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. The CPU 1562 may accomplish these functions under the control of software including an operating system (e.g. Windows NT), and any appropriate application software.

CPU 1562 may include one or more processors 1563 such as a processor from the Motorola family of microprocessors or the MIPS family of microprocessors. In an alternative embodiment, processor 1563 may include specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 6 illustrates one specific network device, it is by no means the only network device architecture on which the disclosed embodiments can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method comprising:
providing a virtual network including a plurality of virtual entities and connections among the plurality of virtual entities;
automatically mapping by a processor each of the plurality of virtual entities to one or more of a plurality of resources of one or more of a plurality of resource pools such that the virtual network is mapped to a physical network, wherein mapping includes allocating the one or more resources or resource pools to a corresponding one of the plurality of virtual entities;
after modifying a first resource of the plurality of resources from a managed state to an unmanaged or maintenance state so that the first resource is no longer available for use, performing a resource replacement procedure including:
identifying that a second resource of the plurality of resources is made available;
identifying that the second resource has the same configuration as the first resource;
raising a fault based on identifying that the second resource has the same configuration as the first resource; and
enabling the first resource to be replaced by the second resource based on the fault being raised.

2. The method of claim 1, wherein at least a first portion of at least one of the plurality of resource pools has been assigned to a first one of a plurality of administrative domains and a second portion of at least one of the plurality of resource pools has been assigned to a second one of the plurality of administrative domains, each of the plurality of administrative domains being associated with a corresponding set of one or more users.

3. The method of claim 2, wherein the first portion of at least one of the plurality of resource pools assigned to the first one of the plurality of administrative domains is visible to the users associated with the first one of the plurality of administrative domains, enabling the users associated with the first one of the plurality of administrative domains to allocate available resources in the first portion of the at least one of the plurality of resource pools to virtual entities.

4. The method of claim 1, wherein allocating one or more resources or resource pools to a corresponding one of the plurality of virtual entities includes allocating one or more resources or resource pools that are in a managed state to the corresponding one of the plurality of virtual entities.

5. The method of claim 1, wherein allocating one or more resources or resource pools comprises automatically allocating one or more storage array ports to one of the plurality of virtual entities.

6. The method of claim 5, wherein allocating one or more resources or resource pools comprises automatically mapping a port associated with the virtual entity to the one or more storage array ports that have been automatically allocated to the virtual entity.

7. The method of claim 1, further comprising:
receiving user input requesting that a state of one of the plurality of resources be modified from an unmanaged state to a managed state;
modifying the state of the resource from the unmanaged state to the managed state if all child resources of the resource are not in a maintenance state, and otherwise not modifying the state of the resource from the unmanaged state to the managed state; and
when the state of the resource is modified from the unmanaged state to the managed state, automatically including the resource in at least one of the plurality of resource pools, wherein the at least one of the plurality of resource pools have criteria matching attributes of the resource.

8. The method of claim 1, further comprising modifying the state of one of the plurality of resources from a managed state to a maintenance state in response to user input, wherein the resource cannot be automatically allocated to a virtual network when the resource is in the maintenance state.

9. The method of claim 1, further comprising:
receiving a request to modify the state of one of the plurality of resources from a managed state to a maintenance state;
determining whether the resource is in use by one or more network devices;
if the resource in use by one or more network devices, marking the resource such that it will not be acquired by additional network devices and automatically modifying the state of the resource to the maintenance state when the resource is no longer in use by one or more network devices; and
if the resource is not in use by one or more network devices, modifying a state of the resource from the managed state to a maintenance state.

10. The method of claim 1, further comprising:
modifying the state of one of the plurality of resources from a managed state to an unmanaged state if the resource and its child resources are not in use by a set of one or more network devices,
wherein the state of the one of the plurality of resources from a managed state to an unmanaged state is not modified if the resource or its child resources are in use by a set of one or more network devices.

11. The method of claim 1,
wherein both the first resources and the second resources comprise hardware resources.

12. The method of claim 2, wherein managed resources that have been assigned to one of the plurality of administrative domains are visible to the users associated with the one of the plurality of administrative domains.

13. The method of claim 12, wherein the users associated with the one of the plurality of administrative domains can allocate the managed resources to the virtual network, the virtual network being defined in the one of the plurality of administrative domains, wherein allocation of the managed resources to the virtual network is performed such that each of the plurality of virtual entities is mapped to one or more of the managed resources such that the virtual network is mapped to a physical network.

14. An apparatus comprising:
a processor; and
a memory, at least one of the processor or the memory being configured to:
provide a virtual network including a plurality of virtual entities and connections among the plurality of virtual entities;
automatically map by a processor each of the plurality of virtual entities to one or more of a plurality of resources of one or more of a plurality of resource pools such that the virtual network is mapped to a physical network, wherein mapping includes allocating the one or more resources or resource pools to a corresponding one of the plurality of virtual entities;
after modifying a first resource of the plurality of resources from a managed state to an unmanaged or maintenance state so that the first resource is no longer available for use, perform a resource replacement procedure including:
  identify that a second resource of the plurality of resources is made available;
  identify that the second resource has the same configuration as the first resource;
  raise a fault based on identifying that the second resource has the same configuration as the first resource; and
  enable the first resource to be replaced by the second resource based on the fault being raised.

15. The apparatus of claim 14, wherein at least a first portion of at least one of the plurality of resource pools has been assigned to a first one of a plurality of administrative domains and a second portion of at least one of the plurality of resource pools has been assigned to a second one of the plurality of administrative domains, each of the plurality of administrative domains being associated with a corresponding set of one or more users.

16. The apparatus of claim 15, wherein the first portion of at least one of the plurality of resource pools assigned to the first one of the plurality of administrative domains is visible to the users associated with the first one of the plurality of administrative domains, enabling the users associated with the first one of the plurality of administrative domains to allocate available resources in the first portion of the at least one of the plurality of resource pools to virtual entities.

17. The apparatus of claim 14, wherein allocating one or more resources or resource pools to a corresponding one of the plurality of virtual entities includes allocating one or more resources or resource pools that are in a managed state to the corresponding one of the plurality of virtual entities.

18. A non-transitory computer-readable medium storing thereon computer-readable instructions comprising:
  instructions for providing a virtual network including a plurality of virtual entities and connections among the plurality of virtual entities;
  instructions for automatically mapping by a processor each of the plurality of virtual entities to one or more of a plurality of resources of one or more of a plurality of resource pools such that the virtual network is mapped to a physical network, wherein mapping includes allocating the one or more resources or resource pools to a corresponding one of the plurality of virtual entities;
  instructions for, after modifying a first resource of the plurality of resources from a managed state to an unmanaged or maintenance state so that the first resource is no longer available for use, performing a resource replacement procedure including:
    instructions for identifying that a second resource of the plurality of resources is made available;
    instructions for identifying that the second resource has the same configuration as the first resource;
    instructions for raising a fault based on identifying that the second resource has the same configuration as the first resource; and
    instructions for enabling the first resource to be replaced by the second resource based on the fault being raised.

19. The non-transitory computer-readable medium of claim 18, wherein the instructions for allocating one or more resources or resource pools to a corresponding one of the plurality of virtual entities include instructions for assigning at least a first portion of at least one of the plurality of resource pools to a first one of a plurality of administrative domains and a second portion of at least one of the plurality of resource pools to a second one of the plurality of administrative domains, each of the plurality of administrative domains being associated with a corresponding set of one or more users.

20. The non-transitory computer-readable medium of claim 19, wherein the instructions for allocating one or more resources or resource pools to a corresponding one of the plurality of virtual entities include instructions for assigning the first portion of at least one of the plurality of resource pools to the first one of the plurality of administrative domains that is visible to the users associated with the first one of the plurality of administrative domains, and enabling the users associated with the first one of the plurality of administrative domains to allocate available resources in the first portion of the at least one of the plurality of resource pools to virtual entities.

* * * * *